United States Patent [19]

Armstrong

[11] Patent Number: 4,473,024
[45] Date of Patent: Sep. 25, 1984

[54] SELF-LOCKING COVERING DEVICE FOR STANDING RIGGING

[76] Inventor: Douglas C. Armstrong, 6348 S. 20 St., Milwaukee, Wis. 53221

[21] Appl. No.: 303,819

[22] Filed: Sep. 21, 1981

[51] Int. Cl.³ .............................................. B63H 9/10
[52] U.S. Cl. ................................... 114/111; 114/102; 403/344; 403/381; 24/576
[58] Field of Search ...................... 114/102, 243, 111; 403/344, 381, 331; 24/201 C, 122.6, 115 R, 201 R

[56] References Cited

U.S. PATENT DOCUMENTS

| | | | |
|---|---|---|---|
| 2,610,879 | 9/1952 | Pope | 24/201 C |
| 3,318,277 | 5/1967 | Palm | 114/102 |
| 3,338,285 | 8/1967 | Jaster | 24/201 C |
| 3,535,204 | 10/1970 | Truxa | 403/381 |
| 3,859,949 | 1/1975 | Toussaint et al. | 114/243 |

FOREIGN PATENT DOCUMENTS 1216168  3/1966  Fed. Rep. of Germany .... 24/201 C

Primary Examiner—Trygve M. Blix
Assistant Examiner—Thomas J. Brahan
Attorney, Agent, or Firm—Quarles & Brady

[57] ABSTRACT

A self-locking covering device (15, 16) for standing rigging (3, 4, 6) of a boat consisting of first and second elements adapted to be positioned about the standing rigging and including mating tongues and grooves which, upon engagement, hold the two elements together in a self-locking condition.

2 Claims, 4 Drawing Figures

SELF-LOCKING COVERING DEVICE FOR STANDING RIGGING

TECHNICAL FIELD

This invention relates to devices for application to the standing rigging of boats in order to reduce chafe and wear of the rigging, sails and sheets.

BACKGROUND ART

Standing rigging on both sailboats and power boats includes shrouds, made of either metal wire or solid metal rod, and turnbuckles or similar fittings for attaching the shrouds to the boat. Lines, such as sheets, can often rub against either the shroud or turnbuckle of the rigging when the lines are adjusted or move about in response to wave action. In the case of sailboats, the sails also can rub against the standing rigging, particularly headsails such as jibs. Rubbing of lines or sails against metallic shrouds or turnbuckles can result in abrasive chafe or wear of the lines, sails and/or standing rigging.

Various types of devices have been made available to fit about standing rigging in order to prevent or lessen the foregoing problems. Covering devices for shrouds are generally referred to as shroud rollers and covering devices for turnbuckles are generally referred to as turnbuckle boots. The shroud roller constructions of which I am aware have been of rather complicated structure, see e.g. U.S. Pat. No. 3,318,277, or they have been difficult to insert about a shroud. For example, some prior shroud rollers require that the shroud be detached from its mountings before the roller can be applied in position about the shroud. Also, some prior shroud rollers need adhesive tape or other fasteners in order to hold two parts of the device together about a shroud. Turnbuckle boots are generally tubular devices that can be positioned about a turnbuckle only when it is detached from the boat.

My present invention was developed with the objective of providing a new improved covering device for standing rigging that does not exhibit the deficiences of prior devices. Another was to provide a two-part covering device for standing rigging in which each part is a unitary element, capable of being extruded in plastic, and in which the two parts interlock with one another to be securely held in position about a shroud or turnbuckle without the need for additional fasteners or tape. Another especially important objective was to design a cross-sectional shape for each part of a shroud roller or turnbuckle boot that would enable the two parts to be snapped together, thereby enabling facile attachment of the device about a shroud or turnbuckle without the need to detach the rigging element from the chain plate or other fitting to which it is attached.

DISCLOSURE OF THE INVENTION

The standing rigging covering device of this invention, as set forth more fully in the following detailed description, comprises a pair of elongate elements of similar construction each having a central axial channel that fits about a shroud or turnbuckle, a projecting axially-extending tongue along one side of the channel and an axially-extending groove along the other side of the channel. The tongue of one element fits into the groove of the other element in order to hold the device in place about the standing rigging. The tongue and groove are designed in such manner that two elements interlock with one another to hold both elements together against radial separation. Further, an axially-extending slit is formed in the wall of each element to communicate with the groove therein so as to enable the wall to spread apart slightly and thereby allow the two elements to snap together when they are to be attached about a rigging element. Alternatively, the tongues may be formed on one of the elements and the grooves formed in the other.

BRIEF DESCRIPTION OF THE DRAWINGS

The invention is fully and clearly described below by reference to the accompanying drawings in which.

BEST MODE FOR CARRYING OUT THE INVENTION

Figure 1:
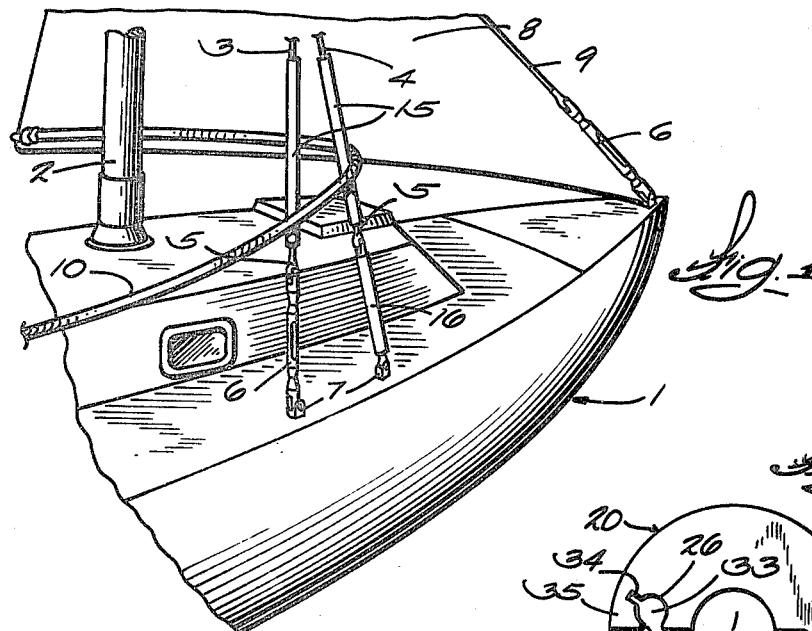
FIG. 1 is a partial perspective view of a sailboat with my new covering device attached to some of the standing rigging.

FIG. 1 illustrates a sailboat 1 with a mast 2 supported by a pair of shrouds 3 and 4 on the starboard side. A similar pair of shrouds, not shown, support the mast on the port side of the boat. The lower ends of the shrouds 3 and 4 have swaged eye fittings 5 that are connected to turnbuckles 6 which are secured to chain plates 7 that are firmly attached to the hull of the boat. The upper ends of the shroud, not shown, are attached to the mast. A jib 8 is supported along its luff on a headstay 9, which also is secured to the hull by means of a turnbuckle 6 at its lower end and attached to the mast at its upper end. The trim of the jib is adjusted by means of a jib sheet 10, comprising a length of rope or line attached to the clew of the jib, there being a similar jib sheet, not shown, on the other side of the boat.

The shrouds 3 and 4 as illustrated are made of wire cable which is formed of a plurality of twisted strands of wire; the shrouds may also be made of solid metal rod. As incicated in FIG. 1, the jib sheet 10 extends around the shrouds and it will usually rub against the shrouds and/or the turnbuckles when the jib is adjusted. The jib sheet is typically made of braided or twisted polyester or nylon rope. The jib normally is of such size as to overlap the shrouds, so that it also will rub against the shrouds or turnbuckles particularly when the boat comes about. The jib will usually be made of coated polyester cloth, nylon cloth or a composite of polyester cloth and polyester film. Both the jib 8 and the jib sheet 10 can become abraded or chafed when they rub against the standing rigging; also, the shroud itself can become chafed after repeated rubbing contact with the jib sheet or the jib.

The standing rigging of the boat 1 carries covering devices made according to this invention so as to eliminate or reduce this chafing or abrasive wear of the jib sheets and other running rigging, the jib or other sails and the shrouds and turnbuckles. The specific devices illustrated in FIG. 1 are the shroud rollers 15 positioned about the shrouds 3 and 4 and the turnbuckle boot 16 positioned about the turnbuckle 6 at the end of shroud 4.

(A) DESCRIPTION OF THE SHROUD ROLLERS

Figure 2:
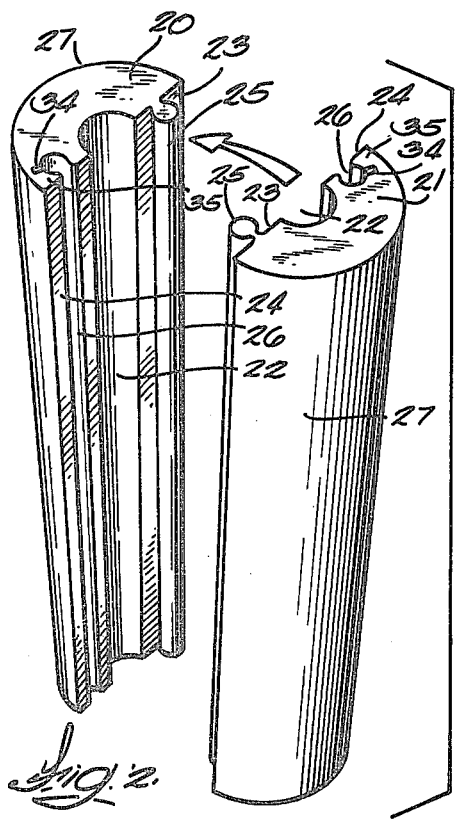
FIG. 2 is a perspective view of the two elements of the new covering device.

Each shroud roller 15 is formed with a pair of mating first and second elements 20 and 21 respectively, which are shown in perspective view in FIG. 2. The elements 20 and 21 are each of the same shape and configuration and include an axially-extending central channel 22 that is to receive a shroud about which the shroud roller is to be attached. Each element 20 and 21 includes axially extending end walls 23 and 24, positioned on opposite sides of the central channel as illustrated in the drawings. An axially-extending tongue 25 projects outwardly from the end wall 23 of each element. An axially-extending groove 26 extends inwardly of the end wall 24 of each element. The outer wall 27 of the elements 20 and 21 is illustrated in the drawings as semicircular in shape, although other configurations may be used such as an oval shape, teardrop shape or even square or rectangular shapes in appropriate instances. The size of the shroud roller 15 will vary depending upon the particular size of wire or rod which it is designed to accommodate. As an example, a shroud roller of apprximately 15/16 inches in diameter in which the central channel 22 of the two elements is about 5/16 inch in diameter is suitable for fitting onto shrouds of ¼ inch or less diameter; this provides a somewhat loose fitting shroud roller which is capable of rotating about the shroud when lines or sails rub against it. The shroud roller may be as long as desired, about 4 or 5 feet being suitable for most applications.

Figure 3:
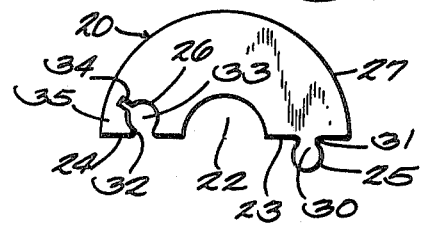
FIG. 3 is a horizontal sectional view showing the cross-sectional configuration of the covering device.

Referring now to FIG. 3, the tongue 25 on the first element 20 includes an enlarged head portion 30 and a narrow neck portion 31 that connects the tongue to the end wall 23. The groove 26 extending along the end wall 24 is of the same cross-sectional configuration as the tongue, and includes a narrow entrance portion 32 that opens upon the end wall 24 and corresponds in shape to the neck portion 31 of the tongue and an enlarged main portion 33 that corresponds in shape to the enlarged head portion 30 of the tongue, the entrance portion 32 and main portion 33 of the groove being sized ot receive, respectively, the neck portion 31 and head portion of a tongue. A narrow axially-extending slit 34 is formed in the element 20 (see also FIG. 2) and opens onto the groove 26. This slit 34 is to facilitate slight radially-outward movement of the edge portion 35 of the element 20 for the purpose explained below. The second element 21 has the same cross-sectional shape as the element 20.

Figure 4:
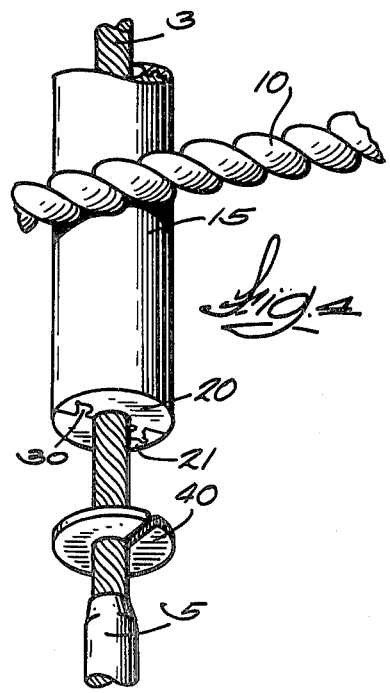
FIG. 4 is an enlarged partial perspective view showing a covering device attached to a shroud.

To assemble the elements 20 and 21 of the shroud roller 15 about a shroud, see also FIG. 4, the two elements are arranged along opposite sides of the shroud, which is received in the mating channels 22 of each element, the tongue 25 of each element is positioned alongside the groove 26 of the other element and the two elements are pressed together until the tongues and grooves become fully engaged with one another. (With long elements, it is generally easier to overlap the two elements about 4 to 6 inches, snap the tongues into the grooves in the overlapped portions, and then slide one element along the other into its final position.) The edge portion 35 of each element moves outwardly a slight amount in order to permit ready engagement of the tongue of one element with the groove of the other. This action is facilitated by reason of the axially-extending slit 34. Once the tongues are fully seated in the grooves, the edge portion 35 reverts to its original position. The two elements are held together by reason of the structure of the tongues and grooves. The narrow neck portion 31 of a tongue becomes seated within the narrow entrance portion 32 of a groove so as to hold the two elements together in a self-locked condition wherein the two elements are restrained from radially-outward disengaging motion inasmuch as the head portion 30 of a tongue is larger transversely of the device than the entrance portion 32 of a groove. Consequently, neither mechanical fasteners nor adhesive tape is required in order to hold the two elements of the shroud roller in their assembled condition about the shroud. Furthermore, the shroud roller 15 can be applied around a shroud without detaching the shroud from the boat.

With reference again to FIG. 4, it is sometimes helpful to insert a split washer 40 about the shroud 3 along the bottom of the shroud roller 15 so that the shroud roller will not work down upon the eye fitting 5 swaged onto the shroud.

The shroud roller 15 as described above can be advantageously made of extruded plastic material, such as polyvinyl chloride, nylon, ABS plastic or other plastics suitable for exterior or outdoor use. I have found ABS plastic to be particularly useful. It is most useful to have the elements 20 and 21 of the same configuration as illustrated in FIGS. 1-4, so that only a single extrusion die will be needed to form the elements of extruded plastic material; however, if so desired, it would be possible to use asymmetrical elements in which one element had two tongues 25 projecting therefrom and the other element had two grooves 26 to receive the tongues.

(B) DESCRIPTION OF TURNBUCKLE BOOT

The turnbuckle boot 16 as illustrated in FIG. 1 also comprises first and second elements which are of the same configuration as the elements 20 and 21 of the shroud roller 15. However, the central channel 22 of each element is to be made of a larger diameter in order to enclose a turnbuckle, since turnbuckles are larger in size than shrouds. Also, the mating two elements for the turnbuckle boot 16 will be shorter in length, with elements about one to two feet long being sufficient to enclose most turnbuckles. When a turnbuckle boot 16 and a shroud roller 15 are both applied over standing rigging as illustrated in connection with shroud 4 in FIG. 1, it is not necessary to include a washer 40 since the larger diameter turnbuckle boot 16 will support the bottom of the shroud roller 15 in the desired position. The turnbuckle boot 16 may be made of the same materials as a shroud roller 15 and its action and installation about a turnbuckle are the same as that of the shroud roller. Again, there is no need to disconnect a turnbuckle 6 from its chain plates or shrouds in order to install a turnbuckle boot 16 of the present invention.

There has thus been described covering devices 15 and 16 for standing rigging of the boats which is capable of attaining the previously stated objectives of this invention and incorporates mating first and second elements that intergage with one another in such fashion that they are positioned about standing rigging element in a self-locking condition wherein one element cannot be radially separated from the other. Further, the new covering devices described herein can be attached about standing rigging without separating the rigging from the boat.

I claim:

1. A self-locking shroud roller for standing rigging of boats consisting of, in combination:
   (1) first and second elements consisting of extruded plastic elements each having an axially-extending central channel of uniform diameter for receiving standing rigging and a pair of axially-extending end walls, one disposed along each side of the central channel,
   (2) a pair of axially-extending tongues projecting from two of the end walls and a pair of axially-extending grooves extending inwardly of the other two end walls of the first and second elements,
      (a) each tongue having a narrow neck portion connecting it to an end wall and an enlarged head portion,
      (b) each groove having a narrow entrance portion adapted to receive the neck portion of a tongue and an enlarged main portion adapted to receive the head portion of a tongue, and
   (3) an axially-extending slit communicating with each groove of the first and second elements and defining an edge portion capable of slight outward movement to facilitate entry of a tongue into a groove upon overlapping of a portion of the first and second elements, the first and second elements being held about standing rigging and restrained against radially-outward disengaging movement upon engagement of the tongues with the grooves.

2. A self-locking shroud roller according to claim 1 wherein:
   (1) the first and second elements each have an axially-extending central channel for receiving standing rigging and a pair of axially-extending end walls, one disposed along each side of the central channel, and
   (2) each element further includes an axially-extending tongue projecting from one of its said end walls and an axially-extending groove extending inwardly of the other of its said end walls.

* * * * *